(12) United States Patent
Bando et al.

(10) Patent No.: US 10,187,818 B2
(45) Date of Patent: Jan. 22, 2019

(54) COMMUNICATION APPARATUS AND COMMUNICATION METHOD

(71) Applicant: Toshiba Memory Corporation, Minato-ku (JP)

(72) Inventors: Yosuke Bando, Yokohama (JP); Yujen Lai, Yokohama (JP); Youyang Ng, Yokohama (JP); Kenichi Maeda, Kamakura (JP); Takeshi Sakoda, Shinagawa (JP); Takaomi Murakami, Kawasaki (JP); Yusuke Doi, Kawasaki (JP); Masahiro Ishiyama, Kawasaki (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 333 days.

(21) Appl. No.: 15/057,381

(22) Filed: Mar. 1, 2016

(65) Prior Publication Data

US 2017/0111819 A1   Apr. 20, 2017

Related U.S. Application Data

(60) Provisional application No. 62/242,664, filed on Oct. 16, 2015.

(51) Int. Cl.
*H04W 28/02* (2009.01)

(52) U.S. Cl.
CPC ... *H04W 28/0289* (2013.01); *H04W 28/0284* (2013.01)

(58) Field of Classification Search
None
See application file for complete search history.

(56) References Cited

U.S. PATENT DOCUMENTS

| 7,817,609 | B2 | 10/2010 | Law et al. | |
|---|---|---|---|---|
| 2008/0049703 | A1* | 2/2008 | Kneckt | H04W 68/00 370/342 |
| 2008/0076442 | A1* | 3/2008 | Ishii | H04W 28/18 455/453 |
| 2012/0224483 | A1 | 9/2012 | Babiarz et al. | |

(Continued)

OTHER PUBLICATIONS

U.S. Appl. No. 15/064,919, filed Mar. 9, 2016, Bando, et al.

*Primary Examiner* — Gregory B Sefcheck
*Assistant Examiner* — Jenkey Van
(74) *Attorney, Agent, or Firm* — Oblon, McClelland, Maier & Neustadt, L.L.P.

(57) ABSTRACT

According to one embodiment, a communication apparatus includes a congestion degree calculating unit and an operation mode setting unit. The congestion degree calculating unit calculates a third congestion degree related to wireless communication based on a first congestion degree of first wireless communication and a second congestion degree of second wireless communication. In the first wireless communication, peer-to-peer communication is performed directly between communication apparatuses, and in the second wireless communication, communication is performed through a wireless communication device. The operation mode setting unit switches an operation mode of the first wireless communication based on the third congestion degree to either of a mode in which the communication apparatus transmits content or a mode in which the communication apparatus receives content.

20 Claims, 7 Drawing Sheets

(56) References Cited

U.S. PATENT DOCUMENTS

| | | |
|---|---|---|
| 2012/0294142 A1* | 11/2012 | Kneckt .............. H04W 74/002 370/229 |
| 2013/0064214 A1 | 3/2013 | Patil et al. |
| 2013/0122947 A1 | 5/2013 | Li et al. |
| 2013/0316757 A1 | 11/2013 | Li et al. |
| 2014/0003237 A1* | 1/2014 | Kenney ................ H04W 28/10 370/235 |
| 2014/0164640 A1* | 6/2014 | Ye .......................... H04L 47/12 709/235 |
| 2014/0321287 A1* | 10/2014 | Zukerman ............ H04L 47/122 370/237 |
| 2014/0321847 A1* | 10/2014 | Zukerman ............... H04L 47/11 398/25 |
| 2015/0085883 A1* | 3/2015 | Vijayasankar ......... H04B 3/542 370/478 |
| 2015/0281023 A1* | 10/2015 | Funabashi ........... H04L 43/0817 370/242 |

* cited by examiner

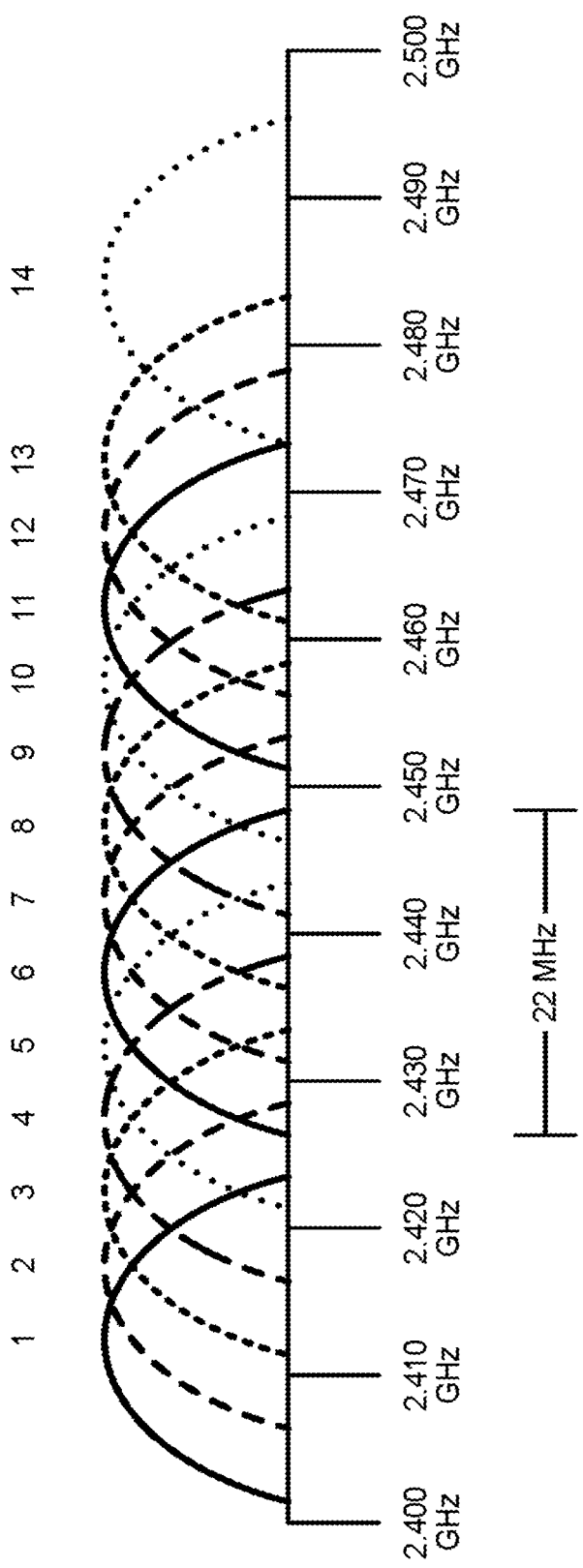

COMMUNICATION APPARATUS AND COMMUNICATION METHOD

CROSS-REFERENCE TO RELATED APPLICATIONS

This application is based upon and claims the benefit of priority from U.S. Provisional Application No. 62/242,664, filed on Oct. 16, 2015; the entire contents of which are incorporated herein by reference.

FIELD

Embodiments described herein relate generally to a communication apparatus and a communication method.

BACKGROUND

As a scheme in which wireless terminals perform wireless communication directly without intervention of a server or the like, a peer-to-peer wireless inter-terminal communication scheme (mobile P2P communication scheme) is known. Further, a communication scheme (hereinafter, referred to as "non-mobile P2P communication scheme") in which wireless terminals perform wireless communication through a wireless access point is known.

However, when a mobile P2P terminal that performs communication according to the mobile P2P communication scheme and a non-mobile P2P device that performs communication according to the non-mobile P2P communication scheme perform communication while ignoring each other, a wireless band is congested, and a communication rate of the mobile P2P communication or the non-mobile P2P communication is lowered.

BRIEF DESCRIPTION OF THE DRAWINGS

FIG. 7 is a diagram for describing frequency overlapping between channels.

DETAILED DESCRIPTION

In general, according to one embodiment, a communication apparatus includes a congestion degree calculating unit, a wireless interface, and an operation mode setting unit. The congestion degree calculating unit calculates a third congestion degree related to wireless communication based on a first congestion degree of first wireless communication and a second congestion degree of second wireless communication. The first wireless communication is wireless communication in which peer-to-peer communication is performed directly between a plurality of communication apparatuses. The second wireless communication is wireless communication in which communication is performed through a wireless communication device connected to an externally provided network. The wireless interface performs the first wireless communication. The operation mode setting unit switches a setting of an operation mode of the first wireless communication of the communication apparatus based on the third congestion degree to either of a first communication mode in which first content is transmitted from the communication apparatus to another communication apparatus or a second communication mode in which second content is received by the communication apparatus from another communication apparatus.

Exemplary embodiments of a communication apparatus and a communication method will be explained below in detail with reference to the accompanying drawings. The present invention is not limited to the following embodiments.

(Embodiment)

Figure 1:
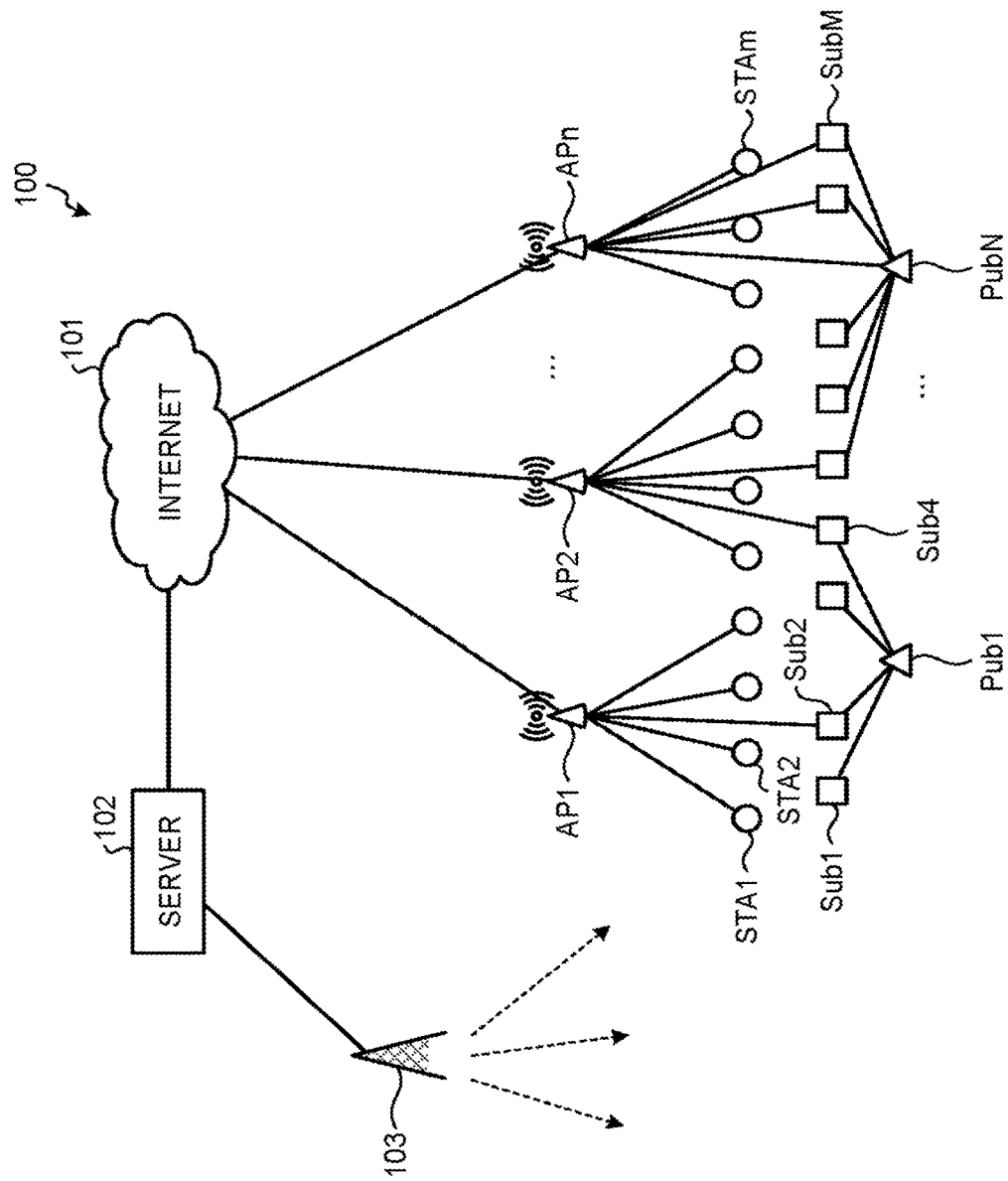
FIG. 1 is a diagram illustrating a configuration of a wireless network according to an embodiment.

FIG. 1 is a diagram illustrating a configuration of a wireless network according to an embodiment. A wireless network 100 includes n (n is a natural number) wireless access points AP1, AP2, . . . , APn as a network infrastructure. The wireless access points AP1, AP2, . . . , APn are connected to the Internet 101 via a wired backbone network. In the following description, there are cases in which the wireless access points AP1, AP2, . . . , APn are individually or collectively referred to as a "wireless access point APx." The wireless access point APx is a communication device that is configured to enable a wireless communication terminal such as a mobile phone or a tablet terminal to be wirelessly connected with the Internet 101 as a station according to a communication standard such as IEEE 802.11. In the following description, wireless communication is assumed to be performed according to a communication standard specified in IEEE 802.11 or a protocol extended therefrom. The present embodiment can be applied to other communication standards.

Further, in the wireless network 100, m (m is a natural number) terminals STA1, STA2, . . . , STAm that operate as stations and perform the Internet access can be connected to any one of the wireless access points APx. In the following description, there are cases in which the terminals STA1, STA2, . . . , STAm are individually or collectively referred to as a "terminal STAx." The terminal STAx is a wireless communication terminal such as a mobile phone or a tablet terminal.

In the wireless network 100, N (N is a natural number) terminals (the publishers Pub1, Pub2, . . . , PubN) serving as delivery sources that perform ad hoc content delivery can perform wireless communication with various devices. In the following description, there are cases in which the publishers Pub1, Pub2, . . . , PubN are individually or collectively referred to as a "publisher(s) Pubx." The terminal Pubx is a wireless communication terminal such as a mobile phone or a tablet terminal.

Further, in the wireless network 100, M (M is a natural number) terminals (subscribers Sub1, Sub2, . . . , SubM) are connected to any one of the publishers Pubx and can receive content from the publishers Pubx. In the following description, there are cases in which the subscribers Sub1, Sub2, . . . , SubM are individually or collectively referred to as a "subscriber(s) Subx."

As described above, the wireless network 100 is configured with various wireless devices (the wireless access point APx, the terminal STAx, the publisher Pubx, and the subscriber Subx) that perform communication using as a wireless band as a medium.

The publishers (senders) Pubx or the subscribers (receivers) Subx may be configured to be connected to the network infrastructure or configured not to be connected to the network infrastructure. A server 102 may be connected to the Internet 101, and the server 102 may be connected to a base station (cell tower) 103. In this case, the publishers Pubx may be configured to be connected to the base station 103 or configured not to be connected to the base station 103. The subscribers Subx may be configured to be connected to the base station 103 or configured not to be connected to the base station 103.

In the wireless network 100, the publisher Pubx delivers content to the subscriber Subx connected to the publisher Pubx. In this case, the publisher Pubx performs content delivery through direct wireless communication between terminals without intervention of the network infrastructure.

The subscriber Subx can function as (perform state transition to) the publisher Pubx that delivers received content to another terminal. Conversely, the publisher Pubx can stop the delivery, perform state transition to the subscriber Subx, and receive content from another publisher Pubx. As described above, the terminal related to the ad hoc content delivery switches its role between the subscriber Subx and the publisher Pubx, and relays content. As a result, it is possible to deliver content to a plurality of terminals which direct wireless communication from the terminal that initially started the delivery does not necessarily reach. Such peer-to-peer content delivery using a mobile wireless communication apparatus such as a mobile phone mainly is referred to as "mobile P2P communication (mobile ad hoc network communication)." Further, terminals including the publisher Pubx and the subscriber Subx in connection with the mobile P2P communication are referred to collectively as "mobile P2P terminals."

In the mobile P2P communication, the publisher Pubx sequentially transmits content to one or more connected subscribers Subx in a unicast manner such that content is delivered to one subscriber Subx at a time. The publisher Pubx may deliver content to a plurality of subscribers Subx in a multicast or broadcast manner rather than the unicast manner. In this case, no reception acknowledgement ACK or retransmission mechanism of the Media Access Control (MAC) layer of Layer 2 is used in the multicast/broadcast transmission. For this reason, a mechanism similar to a reception acknowledgement ACK or retransmission mechanism is assumed to be implemented in the application layer on the mobile P2P terminal. In other words, when it is found that a data packet from the publisher Pubx has been lost, each subscriber Subx transmits a lost packet repair request serving as a reception failure acknowledgement NACK to the publisher Pubx. Then, the publisher Pubx retransmits a lost packet while integrating the repair requests from a plurality of subscribers Subx. As described above, the publisher Pubx transmits the lost packet once even when a plurality of subscribers Subx request the same data packet several times.

A local network for performing the mobile P2P communication is implemented in one of the following modes (A1) and (A2).

(A1) Infrastructure mode: the publisher Pubx activates in its own terminal a temporary wireless access point that is not necessarily connected to the network infrastructure, and transmits a beacon for notifying surrounding terminals of the presence of an access point at regular intervals. In other words, the publisher Pubx serves as the wireless access point and transmits a beacon for notifying of the presence of the access point at a predetermined timing. The subscribers Subx are connected to the access point generated by the publisher Pubx as stations. As a result, a star-shaped local network centering on the publisher Pubx is formed. Communication within the local network is necessarily performed through the publisher Pubx. A temporary access point that is generated by the publisher Pubx, and is different from an access point provided as the network infrastructure is referred to as a mobile P2P access point. The subscriber Subx connected to the mobile P2P access point is referred to as a "mobile P2P station" so as to be distinguished from a station connected to the access point APx.

(A2) Ad hoc mode: the publisher Pubx transmits the beacon for notifying of the presence of an ad hoc network at regular intervals. The subscriber Subx that has joined the ad hoc network plays the same role as the publisher Pubx in maintaining the local network. In other words, the beacon is sequentially transmitted among the mobile P2P terminal configuring the local network. The communication within the local network can directly be performed between arbitrary terminals.

The mobile P2P terminal may be connected to any one of the wireless access points AP1, AP2, . . . , APn serving as the network infrastructure while performing the mobile P2P communication. For example, as illustrated in FIG. 1, the subscriber Sub2 is connected to the wireless access point AP1, the subscriber Sub4 is connected to the wireless access point AP2, and the publisher PubN is connected to the wireless access point APn. In other words, the mobile P2P terminal functions as the station STAx as well. This can be implemented when the mobile P2P terminal includes a plurality of wireless network interfaces.

The station STAx can perform communication with a network provided as an infrastructure such as the Internet 101 through the wireless access point APx. This communication is referred to as "non-mobile P2P communication."

The mobile P2P communication scheme is a communication scheme (peer-to-peer wireless inter-terminal communication scheme) in which the wireless terminals perform wireless communication directly in a peer-to-peer manner without intervention of a server or the like. The non-mobile P2P communication scheme is a wireless communication scheme other than the mobile P2P communication scheme. For example, the non-mobile P2P communication scheme is a communication scheme in which the wireless terminals perform wireless communication through the wireless access point APx.

The mobile P2P terminal having the function of the station STAx can perform the non-mobile P2P communication. The terminal and the wireless access point APx that perform the non-mobile P2P communication are referred to collectively as "non-mobile P2P devices." The same terminal may be both the mobile P2P terminal and the non-mobile P2P device at the same time. Physically, the same terminal is considered to undertake roles of two devices at the same time.

Figure 2:
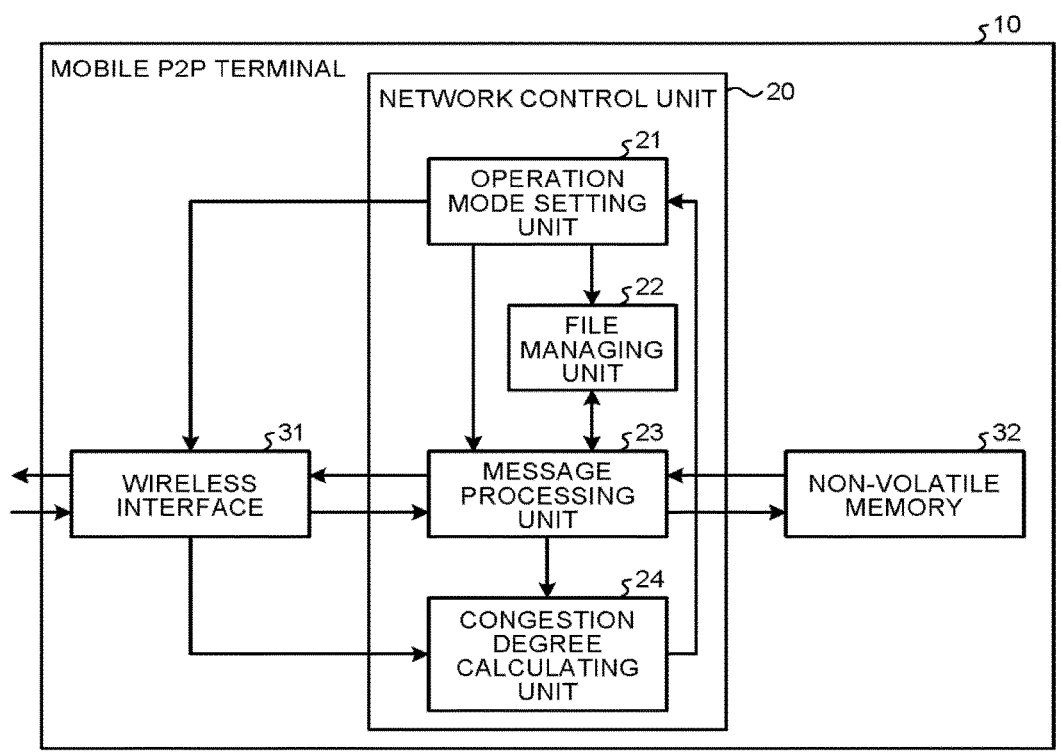
FIG. 2 is a block diagram illustrating an exemplary configuration of a mobile P2P terminal.

FIG. 2 is a block diagram illustrating an exemplary configuration of the mobile P2P terminal. A mobile P2P terminal 10 serving as a communication apparatus is the publisher Pubx or the subscriber Subx. The mobile P2P terminal 10 includes a network control unit 20, a wireless interface 31, and a non-volatile memory 32.

The wireless interface 31 performs a reception process of a wireless signal according to a communication protocol, and, when the received signal is a message addressed to its own device, outputs the message to the network control unit 20. The wireless interface 31 transmits a message generated by the network control unit 20 as a wireless signal according to the communication protocol. The non-volatile memory 32 holds data to be transmitted, received data, and the like.

The network control unit 20 includes an operation mode setting unit 21, a file managing unit 22, a message processing unit 23, and a congestion degree calculating unit 24. The operation mode setting unit 21 of the network control unit 20 sets a mode in which its own device is to operate, that is, a mode specifying whether the own device operates as the publisher Pubx or the subscriber Subx and a transmission condition in which a message is transmitted (a channel, transmission power, a transmission rate, and the like). The operation mode setting unit 21 controls the file managing unit 22, the message processing unit 23, and the wireless interface 31 such that an operation is performed according to an operation mode.

When the mobile P2P terminal 10 operates as the publisher Pubx, the file managing unit 22 generates a table of contents (To (content information) of a group of files to be delivered to the subscriber Subx. In the present embodiment, a bundle of data to be transmitted from the publisher Pubx to the subscriber Subx is referred to as a "file." The file may be any type of data file. For example, the file may be a text file or an image or video data file.

When the mobile P2P terminal 10 operates as the publisher Pubx, the publisher Pubx transmits one or more files through a series of messages. The file managing unit 22 generates the ToC storing information related to the files corresponding to the series of messages before the series of messages are transmitted.

The file managing unit 22 breaks down a file into unit data which is called a chunk (a data chunk) and used when a retransmission process is performed, and allocates a unique identifier to each chunk. The ToC includes an identifier of a file and a list of chunks in the file for each file. For example, a list of chunks in a file may be represented by a list of identifiers of chunks. The present embodiment is not limited thereto, and a list (hereinafter, referred to as a "chunk list") of chunks in a file may be represented by a range of identifiers of chunks to be transmitted when consecutive chunk identifiers are allocated to one file. The message processing unit 23 generates a message (a ToC message) storing the ToC. The wireless interface 31 transmits the ToC message as a wireless signal.

Further, when the mobile P2P terminal 10 operates as the subscriber Subx, the mobile P2P terminal 10 is connected to one (an i-th publisher Pubi) of the neighboring other mobile P2P terminals 10 operating as the publisher Pubx. In other words, the mobile P2P terminal 10 joins the local network to which the publisher Pubi belongs. The wireless interface 31 receives the message sent from the publisher Pubi, and performs a process according to content of the message. The file managing unit 22 holds the chunk list reported through the ToC message transmitted by the publisher Pubi.

Further, when the mobile P2P terminal 10 operates as the publisher Pubx, the message processing unit 23 generates a data message from data constituting a file stored in the non-volatile memory 32. The wireless interface 31 transmits the data message as a wireless signal.

Further, when the mobile P2P terminal 10 operates as the publisher Pubx, the message processing unit 23 performs the retransmission process based on a repair message received from the subscriber Subx belonging to the same local network. Here, the example in which the publisher Pubx transmits data held in the non-volatile memory 32 to the subscriber Subx is described, but the present embodiment can be applied even when data received via a wired line or a wireless line or data stored in another external storage medium is transmitted.

Further, when the mobile P2P terminal 10 operates as the subscriber Subx, the message processing unit 22 extracts data from the data message received from the connected publisher Pubi, and stores the extracted data in the non-volatile memory 32. In this case, the message processing unit 23 determines whether or not the data message has properly been received with reference to the chunk list stored in the ToC held in the file managing unit 22. Further, when the mobile P2P terminal 10 operates as the subscriber Subx, the message processing unit 23 generates the repair request (the repair message) and transfers the repair request to the wireless interface 31 when there is a data message that has failed to be received.

The data message is a message including a chuck serving as a segment of file data to be transmitted from the publisher Pubx to the subscriber Subx. One data message include one or more chunks. One chunk consists of an identifier of the chunk and a byte stream representing data of the chunk. Other information may be additionally included in the chunk.

When a size of a chunk is too large to be transmitted as one data message, a chunk may be divided into smaller unit data such as sectors. In this case, the data message is transmitted in units of sectors, but the retransmission request is made in units of chunks. In this case, the data message includes one or more sectors. The sector consists of an identifier of the sector and a byte stream representing data of the sector. The identifier of the sector includes a pair of an identifier of a chunk in which the sector is included and an index of the sector within the chunk. The publisher Pubx breaks down the ToC into chunks or sectors, and transmits the ToC as the data message, similarly to the file data.

The congestion degree calculating unit 24 acquires communication information (Non-MP2P-info, Others-MP2P-info, and Self-MP2P-info which will be described later) of one or more non-mobile P2P devices and one or more mobile P2P terminals 10 through the wireless interface 31, the message processing unit 23, and any other unit (not illustrated). The congestion degree calculating unit 24 calculates a congestion degree of wireless communication by the non-mobile P2P device and a congestion degree of wireless communication by the mobile P2P terminal 10 based on the communication information.

The congestion degree of the wireless communication indicates a decrease degree of communication rate, a delay (congestion) of data that is transmitted and received, and the like. For example, the congestion degree of the wireless communication may be one corresponding to a ratio of resources available at the time of wireless communication and the number of data transmission requests. Further, the congestion degree of the wireless communication may be one according to wait time before data transmission can be performed or to the number of data transmissions within a predetermined period of time. The congestion degree calculating unit 24 sets an operation mode according to the congestion degree of the wireless communication to the operation mode setting unit 21.

Figure 3:
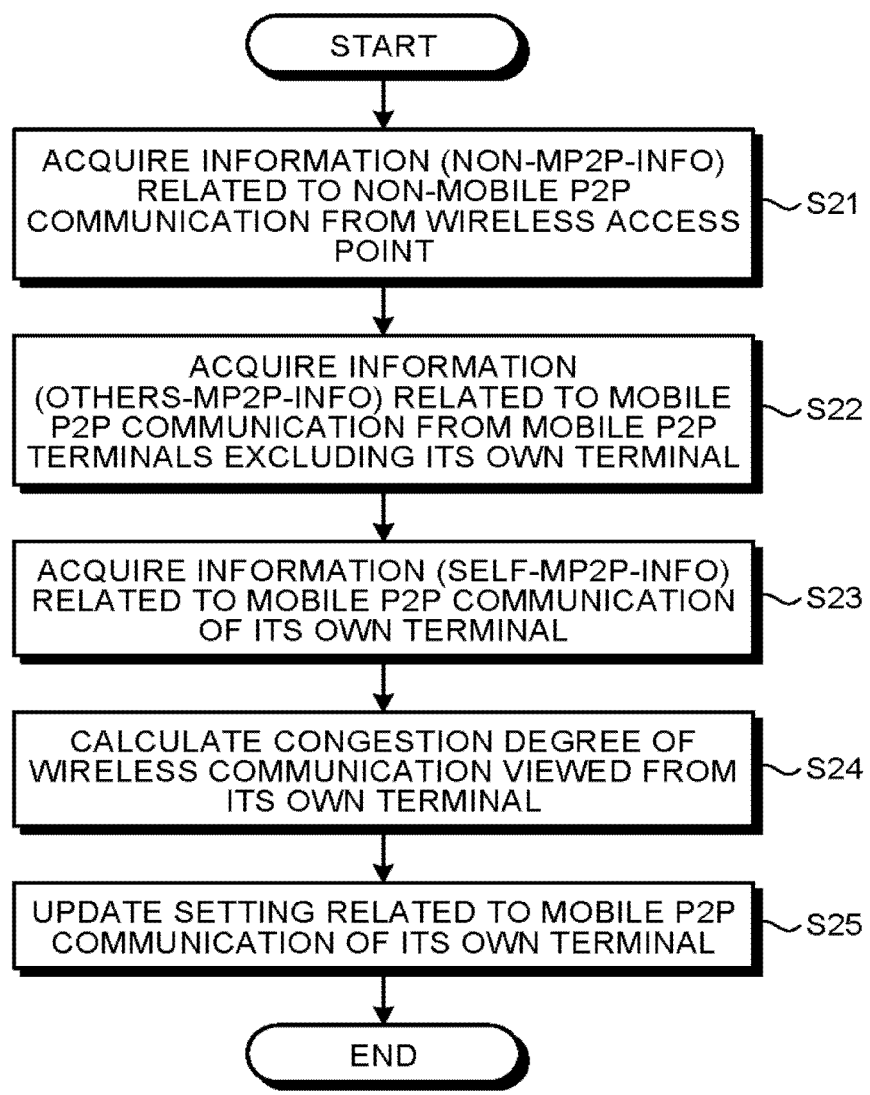
FIG. 3 is a flowchart illustrating a congestion degree calculation process.

FIG. 3 is a flowchart illustrating the congestion degree calculation process. FIG. 3 illustrates a congestion degree calculation process performed by the congestion degree calculating unit 24 according to the embodiment. Here, an I-th (I is a natural number of 1 to N or 1 to M) mobile P2P terminal 10 (a publisher PubI or a subscriber SubI) is described as a terminal PeerI (=PubI or SubI).

The congestion degree calculating unit 24 of the terminal PeerI acquires information (Non-MP2P-info) related to the non-mobile P2P communication from at least some of the wireless access points AP1, AP2, ..., APn (step S21).

Figure 4:
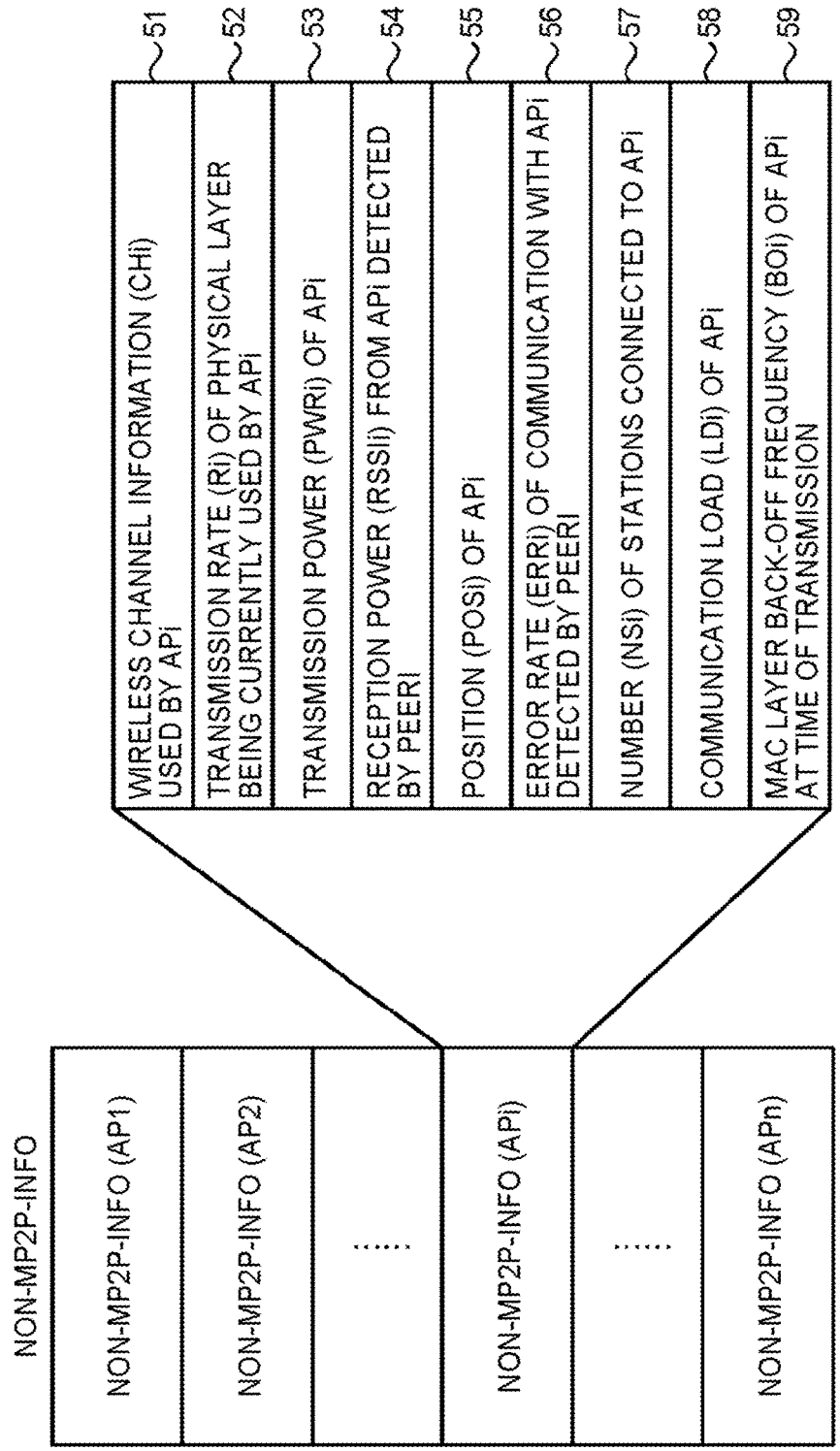
FIG. 4 is a diagram illustrating an exemplary configuration of Non-MP2P-info.

FIG. 4 is a diagram illustrating an exemplary configuration of Non-MP2P-info. Non-MP2P-info is information of properties influencing the congestion degree of the mobile P2P communication, Non-MP2P-info includes information (Non-MP2P-info (AP1) to (APn)) of the non-mobile P2P communication in the wireless access points AP1, AP2, ..., APn.

Here, a configuration of Non-MP2P-info (APi) in an i-th (i is a natural number of 1 to n) wireless access point APi will be described. Non-MP2P-info (APi) is the whole or part of the following AP information 51 to 59. In other words, Non-MP2P-info (APi) includes at least one of the AP information 51 to 59:

the AP information 51: wireless channel information (a frequency and a bandwidth) used by the wireless access point APi: CHi;

the AP information 52: a transmission rate (PHY bitrate) of a physical layer being currently used by the wireless access point APi: Ri;

the AP information 53: transmission power of the wireless access point APi: PWRi;

the AP information 54: reception power (received signal strength indicator: RSSI) from the wireless access point APi detected by the terminal PeerI: RSSIi;

the AP information 55: a position (for example, GPS coordinates of a position at which the wireless access point APi is installed) of the wireless access point APi: POSi;

the AP information 56: an error rate (a probability of packet retransmission due to a packet loss in the MAC layer) of communication with the wireless access point APi which is detected by the terminal PeerI: ERRi;

the AP information 57: the number terminals STAx (the number of stations) connected to the wireless access point APi: NSi;

the AP information 58: a communication load (an amount (Mbps) of data per unit time that is transmitted and received by the wireless access point APi) of the wireless access point APi: LDi; and the AP information 59: a MAC layer back-off frequency (the number of times that back-off has been performed within a predetermined past period of time by carrier sense multiple access with collision avoidance (CSMA/CA) or an average value of contention window sizes during a predetermined past period of time) of the wireless access point APi at the time of transmission: Boi.

CHi is channel information identifying a wireless band used in the non-mobile P2P communication. Among the AP information 51 to 59, CHi and RSSIi can be detected when the terminal PeerI receives a beacon frame broadcast by the wireless access point APi at regular intervals. Thus, the terminal PeerI can acquire CHi and RSSIi without being connected to the wireless access point APi.

Non-MP2P-info related to the non-mobile P2P communication is acquired by any one of the following methods (B1) to (B3) or a combination of the methods.

(B1) The wireless access point APi embeds Non-MP2P-info in the beacon, and broadcasts the resulting beacon. Specifically, the wireless access point APi quantizes Non-MP2P-info, encodes it into a character string of 32 or less characters, ad it to an extended service set identifier (ESSID) indicating a network name, and transmits the resulting data. Alternatively, the wireless access point APi may broadcast Non-MP2P-info using a beacon frame whose specification is extended to include Non-MP2P-info as a payload. In the case of information acquisition by the beacon, the terminal PeerI collects Non-MP2P-info from all the access points APx that the terminal PeerI can detect the beacon from.

(B2) The wireless access point APi uploads Non-MP2P-info to the server 102 via the Internet 101. Then, the terminal PeerI downloads Non-MP2P-info from the server 102 using a separate communication means such as a mobile telephone network via the base station 103 or the like. In this case, the terminal PeerI transmits a position of its own terminal determined by a global positioning system (GPS), WiFi (a registered trademark), or the like to the server 102. Then, the server 102 transmits Non-MP2P-info of the access point APx close to the position of the terminal PeerI to the terminal PeerI.

(B3) The terminal PeerI connects to the wireless access point APi and receives Non-MP2P-info. At this time, the terminal PeerI can acquire values of Ri and ERRi at the time of reception when unicast communication with the wireless access point APi is performed. The wireless access point APi transmits Non-MP2P-info other than Ri and ERRi to the terminal PeerI as data. As a result, the terminal PeerI can receive Non-MP2P-info other than Ri and ERRi from the wireless access point APi. If the terminal PeerI repeatedly performs a connection and communication with all the access points APx, it takes time. For this reason, the terminal PeerI acquires information only from the access point APx that is highest in the RSSI obtained from the beacon or several access points APx that are high in the RSSI.

Further, the congestion degree calculating unit 24 of the terminal PeerI receives information (Others-MP2P-info) related to the mobile P2P communication from at least some of the mobile P2P terminals (the mobile P2P terminals Pub1, Pub2, ..., PubN and Sub1, Sub2, ..., SubM) excluding its own terminal (step S22).

Figure 5:
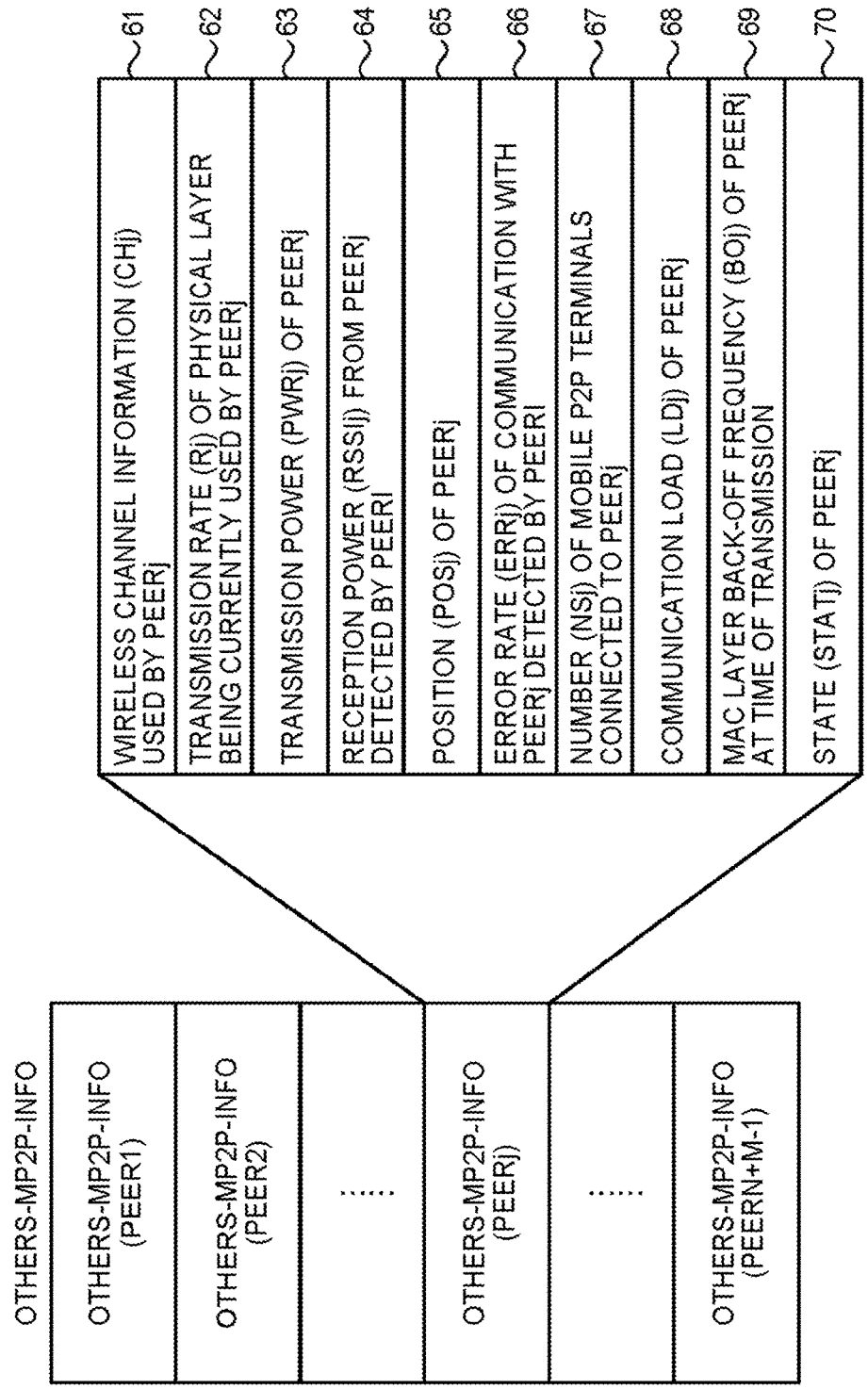
FIG. 5 is a diagram illustrating an exemplary configuration of Others-MP2P-info.

FIG. 5 is a diagram illustrating an exemplary configuration of Others-MP2P-info. Others-MP2P-info is information of properties influencing the congestion degree of the mobile P2P communication. Others-MP2P-info includes information (Others-MP2P-info (Peer1) to (PeerN+M−1)) related to the mobile P2P communication in the mobile P2P terminals Pub1, Pub2, ..., PubN and Sub1, Sub2, ..., SubM other than its own terminal.

Here, a configuration of Others-MP2P-info (Peerj) in a j-th (j is a natural number of 1 to (N+M−1) excluding I) mobile P2P terminal (a terminal Peerj) will be described. Others-MP2P-info (Peerj) is all or some of the following MP2P information 61 to 70. In other words, Others-MP2P-info (Peerj) includes at least one of the MP2P information 61 to 70:

the MP2P information 61: wireless channel information (a frequency and a bandwidth) used by the terminal Peerj: CHj;

the MP2P information 62: a transmission rate (PHY bitrate) of a physical layer being currently used by the terminal Peerj: Rj;

the MP2P information 63: the transmission power of the terminal Peerj: PWRj;

the MP2P information 64: the reception power (the received signal strength indicator: RSSI) from the terminal Peerj which is detected by the terminal PeerI: RSSIj;

the MP2P information 65: a position of the terminal Peerj: POSj (for example, GPS coordinates of a position at which the terminal Peerj is currently positioned);

the MP2P information 66: an error rate of communication with Peerj which is detected by the terminal PeerI: ERRj (a probability of packet retransmission due to a packet loss in the MAC layer) or a probability that the terminal PeerI receives a repair request and performs a repair response (that is, retransmission) at an application layer when multicasting/broadcasting is used in the mobile P2P communication;

the MP2P information 67: the number mobile P2P terminals connected to the terminal Peerj: NSj;

the MP2P information 68: a communication load of the terminal Peerj: LDj (an amount (Mbps) of data per unit time that is transmitted and received by the terminal Peerj);

the MP2P information 69: the MAC layer back-off frequency of the terminal Peerj at the time of transmission: BOj (the number of times that back-off has been performed by CSMA/CA within a predetermined past period of time or an average value of contention window sizes during a predetermined past period of time); and the MP2P information 70: a state of the terminal Peerj: STATj (publisher or subscriber).

The terminal PeerI acquires CHj and RSSIj among the MP2P information 61 to 70 through any one of the following methods (C1) and (C2).

(C1) When the mobile P2P communication is performed in the infrastructure mode, and the terminal Peerj functions as the publisher (Peerj=Pubj), the terminal PeerI acquires CHj and RSSIj from the beacon frame broadcast by the terminal Peerj at regular intervals.

(C2) When the mobile P2P communication is performed in the ad hoc mode, the terminal PeerI acquires CHj and RSSIj from the beacon frame broadcast by the terminal Peerj at regular intervals.

Others-MP2P-info related to the other mobile P2P communication is directly acquired when the terminal PeerI forms the local network with the terminal Peerj. Further, when the terminal PeerI does not form the local network with the terminal Peerj, Others-MP2P-info is acquired indirectly (for example, while switching the local networks and performing multi-hopping). Specifically, Others-MP2P-info is acquired by any one of the following methods (D1) to (D3) or a combination of the methods.

(D1) The terminal Peerj embeds Others-MP2P-info in the beacon, and broadcasts the resulting beacon. Specifically, the terminal Peerj quantizes Others-MP2P-info, encodes it into a character string of 32 or less characters, adds it to an ESSID indicating a network name included in the beacon, and transmits the resulting data. Alternatively, the terminal Peerj may broadcast Others-MP2P-info using a beacon frame whose specification is extended to include Others-MP2P-info as a payload. In the case of information acquisition by the beacon, the terminal PeerI collects information from all the terminals Peerj that the terminal PeerI can detect the beacon from. Further, when the mobile P2P communication is implemented in the infrastructure mode, and the terminal Peerj functions as the subscriber (Peerj=Subj), the terminal Peerj does not broadcast the beacon. In this case, the terminal PeerI does not acquire Others-MP2P-info from the subscriber Subj.

(D2) The terminal Peerj uploads Others-MP2P-info to the server 102 using a separate communication means such as a mobile telephone network via the base station 103, the Internet 101 via the wireless access point APx, or the like. Then, the terminal PeerI downloads Others-MP2P-info from the server 102 using a separate communication unit (the wireless access point APx, the base station 103, or the like) such as a mobile telephone network. In this case the terminal PeerI transmits a position of its own terminal determined by the GPS, WiFi (a registered trademark), or the like to the server 102. Then, the server 102 transmits Others-MP2P-info of the mobile P2P terminal (the terminal Peerj) close to the position of the terminal PeerI to the terminal PeerI.

(D3) When the terminal PeerI and the terminal Peerj belong to the same local network in the mobile P2P communication, the terminal PeerI directly receives Others-MP2P-info via the local network. At this time, the terminal PeerI can acquire the values of Rj and ERRj at the time of reception when unicast communication with Peerj is performed. The terminal PeerI transmits Others-MP2P-info other than Rj and ERRj to the terminal PeerI as data. As a result, the terminal PeerI can receive Others-MP2P-info other than Rj and ERRj from the terminal Peerj.

Further, the congestion degree calculating unit 24 of the terminal PeerI acquires information (Self-MP2P-info) related to the mobile P2P communication in its own terminal PeerI (step S23).

Figure 6:
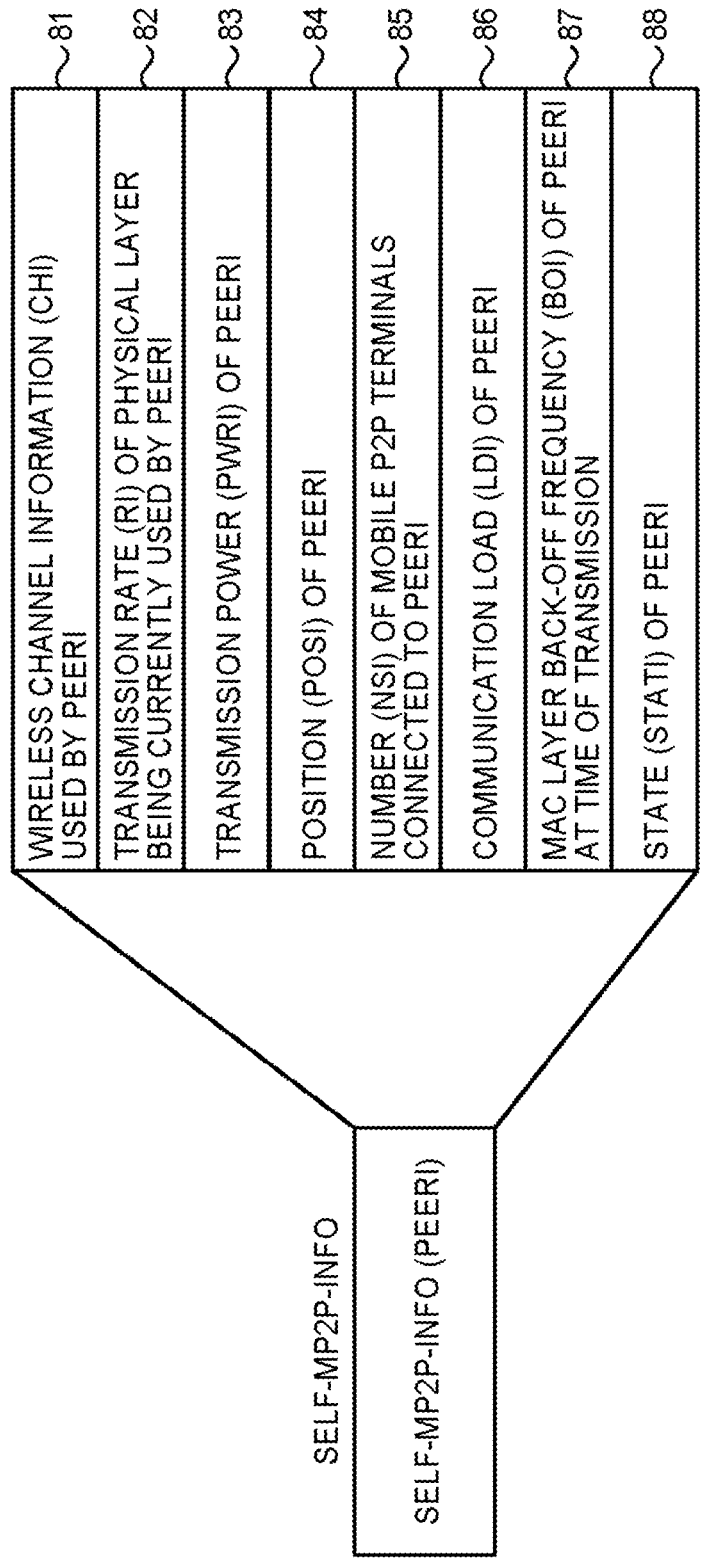
FIG. 6 is a diagram illustrating an exemplary configuration of Self-MP2P-info.

FIG. 6 is a diagram illustrating an exemplary configuration of Self-MP2P-info. Self-MP2P-info is information of properties influencing the congestion degree of the mobile P2P communication. Self-MP2P-info (PeerI) is all or some of the following MP2P information 81 to 88. In other words, Self-MP2P-info (PeerI) includes at least one of the MP2P information 81 to 88:

the MP2P information 81: wireless channel information (a frequency and a bandwidth) used by the terminal PeerI: CHI;

MP2P information 82: the transmission rate (PHY bitrate) of the physical layer being currently used by the terminal PeerI: RI;

the MP2P information 83: the transmission power of the terminal PeerI: PWRI;

the MP2P information 84: a position of the terminal PeerI (for example, GPS coordinates of a position at which the terminal PeerI is currently positioned): POSI;

the MP2P information 85: the number of mobile P2P terminals connected to the terminal PeerI: NSI;

the MP2P information 86: a communication load of the terminal PeerI (an amount (Mbps) of data per unit time that is transmitted and received by the terminal PeerI): LDI;

the MP2P information 87: the MAC layer back-off frequency of the terminal PeerI at the time of transmission (the number of times that back-off has been performed by CSMA/CA within a predetermined past period of time or an average value of contention window sizes during a predetermined past period of time): BOI; and the MP2P information 88: a state of the terminal PeerI (publisher or subscriber): STATI.

The order of steps S21, S22, and S23 is arbitrary. After steps S21 to S23, the congestion degree calculating unit 24 of the terminal PeerI calculates the congestion degree of the wireless communication observed by its own terminal PeerI (step S24).

When selectable channels are 1, 2, ..., K (K is a natural number), the congestion degree calculating unit 24 calculates a congestion degree Non-MP2P-congestion(k) of the channel k by the non-mobile P2P communication and a congestion degree MP2P-congestion(k) of the channel k by the mobile P2P communication for each channel k ($1 \leq k \leq K$). In other words, the congestion degree calculating unit 24 calculates the congestion degree of the non-mobile P2P communication and the congestion degree of the mobile P2P communication corresponding to individual channels. At this time, the congestion degree calculating unit 24 calculates the congestion degree based on the communication information (Non-MP2P-info, Others-MP2P-info, and Self-MP2P-info) acquired in the process of steps S21 to S23.

The congestion degree Non-MP3P-congestion k of the channel k by the non-mobile P2P communication can be expressed by the following Formula (1). Further, the congestion degree MP2P-congestion(k) of the channel k by the mobile P2P communication can be expressed by the following Formula (2).

$$\text{Non-MP2P-congestion}(k) = \text{func}(\text{Non-MP2P-info}) \tag{1}$$

$$\text{MP2P-congestion}(k) = \text{func}(\text{Others-MP2P-info, Self-MP2P-info}) \tag{2}$$

Here, func( ) indicates a certain function, examples of which are described below.

(Congestion Degree of Non-mobile P2P Communication)

An example of a calculation formula of the congestion degree Non-MP2P-congestion(k) of the non-mobile P2P communication includes the following Formula (1X):

$$\begin{aligned}\text{Non-MP2P-congestion}(k) = \Sigma i=1, \ldots, n\ \text{ch2c}(k,\ CHi)\\ (C1\ \text{r2c}(Ri)+C2\ \text{pwr2c}(PWRi)+C3\ \text{rssi2c}\\ (RSSIi)+C4\ \text{pos2c}(POSi)+C5\ \text{err2c}(ERRi)+C6\\ \text{ns2c}(NSi)+C7\ \text{ld2c}(LDi)+C8\ \text{bo2c}(BOi))\end{aligned} \tag{1X}$$

Here, C1 to C8 in Formula (1X) are weight coefficients for adjusting contributions of respective terms. ch2c(k, ch) is a function that converts information of a channel into a congestion degree element and expressed by the following Formulas (1A) and (1B).

$$\text{ch2c}(k, \text{ch}) = 1\ (k=\text{ch}) \tag{1A}$$

$$\text{ch2c}(k, \text{ch}) = 0\ (\text{otherwise}) \tag{1B}$$

In the non-mobile P2P communication, only when a channel ch being currently used is identical to k, it contributes to the congestion degree of the channel k.

FIG. 7 is a diagram for describing frequency overlapping between channels. In the non-mobile P2P communication, for example, any one of channels 1 to 13 is used at a 2.4 GHz band. Formulas (1A) and (1B) are formulas used when there is no overlap between channels such as when channels 1, 6, and 11 (FIG. 7) are used in 2.4 GHz band WiFi (a registered trademark) or when 5 GHz band WiFi (a registered trademark) is used.

When overlapping channels (for example, channels 2 and 3 in 2.4 GHz band WiFi (a registered trademark)) are permitted to be used, a value of ch2c(k, ch) is given according to a mutual interference degree (overlap of lobes in FIG. 7). In other words, for different channels (for example, k=1, ch=2) that interfere with each other, a value larger than 0 and less than 1 is given as a value of ch2c(1, 2) such as ch2c(1, 2)=0.6.

r2c(r) is a function that converts a transmission rate r (a unit is Mbps) into a congestion degree element and can be expressed by the following Formula (1-1).

$$\text{r2c}(r) = 1/r \tag{1-1}$$

In the wireless communication, as the transmission rate decreases, a period of time taken for data transmission increases, and thus the congestion degree of the wireless communication increases. r2c(r) may be a decreasing function of the transmission rate r rather than Formula (1-1).

pwr2c(pwr) is a function that converts transmission power pwr (a unit is mW) into a congestion degree element and can be expressed by the following Formula (1-2).

$$\text{pwr2c}(\text{pwr}) = \text{pwr} \tag{1-2}$$

In the wireless communication, as the transmission power increases, the congestion degree of the wireless communication increases. pwr2c(pwr) may be an increasing function of the transmission power pwr rather than Formula (1-2).

rssi2c(rssi) is a function that converts reception power rssi (a unit is mW) into a congestion degree element and can be expressed by the following Formula (1-3).

$$\text{rssi2c}(\text{rssi}) = \text{rssi} \tag{1-3}$$

In the wireless communication, as the reception power increases, the congestion degree of the wireless communication increased. rssi2c(rssi) may be an increasing function of the reception power rssi rather than Formula (1-3).

pos2c(pos) is a function that converts a position (geographical coordinates) pos of the wireless access point APi into a congestion degree element and can be expressed by the following Formula (1-4).

$$\text{pos2c}(\text{pos}) = 1/|\text{pos}-\text{POSI}| \tag{1-4}$$

Here, POSI indicates the position of its own terminal PeerI, and |pos−POSI| indicates a distance (a unit is m) between the wireless access point APi and its own terminal PeerI. In the wireless communication, as the distance decreases, the congestion degree of the wireless communication increases. pos2c(pos) may be a decreasing function of the distance pos POSI rather than Formula (1-4).

err2c(err) is a function that converts an error rate err (0≤err≤1, err=0 indicates that there is no error, and err=1 indicates that there is always an error) of data transmission and reception of the wireless access point APi and its own terminal PeerI into a congestion degree element and can be expressed by the following Formula (1-5).

$$\text{err2c}(\text{err}) = \text{err} \tag{1-5}$$

In the wireless communication, as the error rate increases, the congestion degree of the wireless communication increases. err2c(err) may be an increasing function of the error rate err rather than Formula (1-5).

ns2c(ns) is a function that converts the number ns of terminals STAx connected to the wireless access point APi into a congestion degree element and can be expressed by the following Formula (1-6).

$$\text{ns2c}(\text{ns}) = \text{ns} \tag{1-6}$$

In the wireless communication, as the number of terminals STAx increases, the congestion degree of the wireless communication increases. ns2c(ns) may be an increasing function of the number ns of terminals rather than Formula (1-6).

ld2c(ld) is a function that converts a load (an average value in units of Mbps of a data transfer amount during a predetermined past period of time, for example, for one minutes) ld of the wireless access point APi into a congestion degree element and can be expressed by the following Formula (1-7).

$$\text{ld2c}(\text{ld}) = \text{ld} \tag{1-7}$$

In the wireless communication, as the load increases, the congestion degree of the wireless communication increases. ld2c(ld) may be an increasing function of the load ld rather than Formula (1-7). As a calculation example of the load ld, when a data amount transferred for one minute is assumed to be 60 MB, an average load ld=60 MB/60 seconds=8 Mbps.

bo2c(bo) is a function that converts the number of times that back-off has been performed in the MAC layer before the wireless access point APi performs transmission within a predetermined past period of time (for example, for one minute) into a congestion degree element and can be expressed by the following Formula (1-8).

$$\text{bo2c}(\text{bo}) = \text{bo} \tag{1-8}$$

In the wireless communication, the number of times of back-off increases, the congestion degree of the wireless communication increases. bo2c(bo) may be an increasing function for the number bo of times of back-off rather than Formula (1-8). Further, instead of the number of times of back-off, an average value of contention window sizes during a predetermined past period of time (for example, for one minute) may be used.

The congestion degree Non-MP2P-congestion($k$) of the channel k by the non-mobile P2P communication is obtained by calculating the congestion degree elements for the respective wireless access points APi, obtaining a weighted sum of the calculation results excluding the channel congestion degree element ch2c(ch, $k$), multiplying by the channel congestion degree element ch2c(ch, $k$), and obtaining a sum for all APs (i=1 to n). The congestion degree calculating unit 24 does not include in the sum the value for the wireless access point APx whose information is not acquired.

(Congestion Degree of Mobile P2P Communication)

An example of a calculation formula of the congestion degree MP2P-congestion($k$) of the mobile P2P communication includes the following Formula (2X):

MP2P-congestion($k$)=Sstat(STATI)ch2c($k$, CHI)($C1$ r2c(RI)+$C2$ pwr2c(PWRI)+$C6$ ns2c(NSI)+$C7$ ld2c(LDI)+$C8$ bo2c(BOI))+$\Sigma j$=1, ..., $N$+$M$, $j \neq I$ Sstat(STATj)ch2c($k$, CHj)($C1$ r2c(Rj)+$C2$ pwr2c(PWRj)+$C3$ rssi2c(RSSIj)+$C4$ pos2c (POSj)+$C5$ err2c(ERRj)+$C6$ ns2c(NSj)+$C7$ ld2c (LDj)+$C8$ bo2c(BOj))  (2X)

Here, C1 to C8 in Formula (2X) are weight coefficients for adjusting contributions of respective terms. C1 to C8 in Formula (2X) may be the same as or may be different from C1 to C8 in Formula (1X).

The definitions of the respective congestion degree element functions are the same as those described above. The congestion degree calculating unit 24 adds the sum of the congestion degrees of the mobile P2P terminals excluding its own terminal among the N publishers Pubx and the M subscribers Subx (here, N and M may change over) to the congestion degree of its own terminal PeerI.

Sstat(stat) is a weight coefficient that adjusts a weight according to whether the terminal PeerI is the publisher Pubx (stat=publisher) or the subscriber Subx (stat=subscriber). Since the publisher Pubx generally has more transmission opportunities than the subscriber Subx, Sstat(publisher) is set to be larger than Sstat(subscriber).

After the congestion degree calculating unit 24 calculates the congestion degree of the wireless communication, the operation mode setting unit 21 updates a setting related to the mobile P2P communication in its own terminal PeerI (step S25). For example, when its own terminal PeerI is the publisher Pubx (PeerI=PubI and STATI=publisher), all or some of processes indicated by (E1) to (E5) are performed (a setting is changed).

(E1) Update of a wireless channel CHI used by PeerI: the operation mode setting unit 21 selects a channel having the lowest congestion degree. In other words, the operation mode setting unit 21 selects k that minimizes Sch1 Non-MP2P-congestion($k$)+Sch2 MP2P-congestion($k$) as an updated channel CHI. Here, Sch1 and Sch2 are weight coefficients of the congestion degrees of the non-mobile P2P communication and the mobile P2P communication. For example, when Sch1>Sch2, a channel least utilized by the non-motile P2P communication is likely to be selected.

(E2) Update of transmission power PWRI of PeerI: the operation mode setting unit 21 decreases the transmission power according to the congestion degree of the selected channel. When the channel k is in use, the operation mode setting unit 21 calculates the transmission power PWRI through the following Formula (E2-1).

PWRI=$P$max−Spwr1 min{Non-MP2P-congestion($k$), Tpwr1}−Spwr2 min{MP2P-congestion($k$), Tpwr2}  (E2-1)

Here, Tpwr1 and Tpwr2 are threshold values of the congestion degrees, Pmax is a maximum value (the transmission power when the congestion degree 0) of the transmission power, and Spwr1 and Spwr2 are coefficients for decreasing the transmission power according to the congestion degrees. The threshold values Tpwr1 and Tpwr2 have an effect of preventing the transmission we PWRI from becoming too small when the congestion degrees Non-MP2P-congestion($k$) and MP2P-congestion($k$) increase. Further, the operation mode setting unit 21 may use the following Formula (E2-2).

PWRI=max{$P$min,$P$max−Spwr1 Non-MP2P-congestion($k$)−Spwr2 MP2P-congestion($k$)}  (E2-2)

Here, Pmin is a minimum value of the transmission power. Pmin, Pmax, Spwr1, Spwr2, Tpwr1, and Tpwr2 may not be a common value to the mobile P2P terminals and may be set to different values according to each mobile P2P terminal. Further, the values of Pmin, Pmax, Spwr1, Spwr2, Tpwr1, and Tpwr2 may dynamically be changed according to each mobile P2P terminal. The transmission power PWRI may be set by a decreasing function of Non-MP2P-congestion($k$) and MP2P-congestion($k$) rather than Formula (E2-1) and Formula (E2-2).

(E3) Update of data transmission frequency used by PeerI: the operation mode setting unit 21 decreases the data transmission frequency as the congestion degree increases. When the channel k is in use, the operation mode setting unit 21 configures the setting such that the wireless interface 31 cancels transmission at a probability p1 calculated by the following Formula (E3-1) at the time of packet transmission.

$p1$=Sfrq1 min{Non-MP2P-congestion($k$),Tfrq1}+ Strq2 min{MP2P-congestion($k$),Tfrq2}  (E3-1)

Here, Tfrq1 and Tfrq2 are threshold values of the congestion degrees, and Sfrq1 and Sfrq2 are coefficients for increasing a transmission suspension probability according to the congestion degrees. The threshold values Tfrq1 and Tfrq2 have an effect of preventing the data transmission frequency from becoming too small when the congestion degrees Non-MP2P-congestion($k$) and MP2P-congestion($k$) increase. Further, instead of stochastically decreasing the transmission frequency, the operation mode setting unit 21 may keep the transmission frequency constantly low by setting an actual data transmission rate (of the application layer) to (1−$p1$)RI for a transmission rate RI of the physical layer that is in use. Sfrq1, Sfrq2, Tfrq1, and Tfrq2 may not be a common value to the mobile P2P terminals and may be set to different values according to each mobile P2P terminal. Further, the values of Sfrq1, Sfrq2, Tfrq1, Tfrq2 may dynamically be changed according to each mobile P2P terminal. The probability p1 may be set by an increasing function of Non-MP2P-congestion($k$) and MP2P-congestion ($k$) rather than Formula (E3-1).

(E4) Update of the stat STATI of PeerI: when the congestion degree is high, state transition from the publisher Pubx to the subscriber Subx is performed. When the channel k is in use, the operation mode setting unit 21 evaluates the following Formula (E4-1) at predetermined time intervals, calculates a probability p2, and performs state transition based on the probability p2.

$p2$=Sdem1 min{Non-MP2P-congestion($k$), Tdem1}+ Sdem2 min{MP2P-congestion($k$), Tdem2}  (E4-1)

Here, Tdem1 and Tdem2 are threshold values of the congestion degrees, and Sdem1 and Sdem2 are coefficients for increasing a state transition probability according to the congestion degrees. The first term of Formula (E4-1) indicates that when the number of wireless access points APxs that perform the non-mobile P2P communication around its own terminal PeerI is large, the probability that its own terminal PeerI will become the subscriber Subx is high. In other words, its own terminal PeerI stops playing the role of the publisher Pubx and performs state transition to the subscriber Subx. As a result, its own terminal PeerI reduces the number of publishers Pubx and mitigates the congestion.

Further, the second term of Formula (E4-1) indicates that when the number of terminals (the publishers Pubx and the subscribers Subx) that perform the mobile P2P communication around its own terminal PeerI is large, the probability that its own terminal PeerI will become the subscriber Subx is high. In other words, its own terminal PeerI stops playing the role of the publisher Pubx, and performs state transition to the subscriber Subx. As a result, its own terminal PeerI reduces the number of publishers Pubx and mitigates the congestion. The state transition occurs probabilistically, but since the evaluation is performed again in a predetermined period of time, when there is no change in probability, the state transition is more likely to be performed as time passes. The threshold values Tdem1 and Tdem2 have an effect of preventing the probability of the state transition from becoming too large when the congestion degrees Non-MP2P-congestion(k) and MP2P-congestion(k) increase. Sdem1, Sdem2, Tdem1, and Tdem2 may not be a common value to the mobile P2P terminals and may be set to different values according to each mobile P2P terminal. Further, the values of Sdem1, Sdem2, Tdem1, and Tdem2 may dynamically be changed according to each mobile P2P terminal. The probability p2 may be set by an increasing function of Non-MP2P-congestion(k) and MP2P-congestion(k) rather than Formula (E4-1).

(E5) Suspension of multicast transmission: the operation mode setting unit 21 configures the setting such that the wireless interface 31 suspends multicast transmission when the congestion degree is high. When the mobile P2P local network is implemented in the infrastructure mode, if the subscriber Subx multicasts the repair request, the repair request is first unicast to the publisher Pubx. Thereafter, the publisher Pubx multicasts the repair request to the other subscribers Subx. In this case, when the congestion degree is high, the multicasting from the publisher Pubx is postponed. In other words, the multicasting from the publisher Pubx is delayed by a period of time according to a magnitude of the congestion degree. For example, when a value v calculated by the following Formula (E5-1) exceeds a threshold value, the publisher Pubx first stores in a buffer a repair request unicast from the subscriber Subx as a multicast packet. Then, the publisher Pubx delivers the repair request in the multicast manner as part of content delivery from the publisher Pubx later.

$$v = \text{Smul1 Non-MP2P-congestion}(k) + \text{Smul2 MP2P-congestion}(k) \quad (E5\text{-}1)$$

Here, Smul1 and Smul2 are weight coefficients. Smul1, Smul2, and the threshold value may not be a common value to the mobile P2P terminals and may be set to different values according to each mobile P2P terminal. Further, the values of Smul1, Smul2, and the threshold value may be dynamically changed according to each mobile P2P terminal. The value v may be set by an increasing function of Non-MP2P-congestion(k) and MP2P-congestion(k) rather than Formula (E5-1).

When its own terminal PeerI is the subscriber Subx (PeerI=SubI and STATI=subscriber), the update of the setting related to the mobile P2P communication in step S25 is performed as in the following process (F1).

(F1) The terminal PeerI becomes the publisher when the congestion degree is low. Specifically, the terminal PeerI performs state transition from the subscriber Subx to the publisher based on a probability p3 calculated by the following Formula (F1-1).

$$p3 = \rho \text{Spro1 min}\{\text{Non-MP2P-congestion}(k), \text{Tpro1}\} - \text{Spro2 min}\{\text{MP2P-congestion}(k), \text{Tpro2}\} \quad (F1\text{-}1)$$

Here, Tpro1 and Tpro2 are threshold values of the congestion degrees, and Spro1 and Spro2 are coefficients for decreasing the probability of the state transition according to the congestion degrees. $\rho$ is a transition probability ($0 \leq \rho \leq 1$) when the congestion degrees are 0. The threshold values Tpro1 and Tpro2 have an effect of preventing the probability of the state transition from becoming to small when the congestion degrees Non-1P2P-congestion(k) and MP2P-congestion(k) increase. $\rho$, Spro1, Spro2, Tpro1, and Tpro2 may be a common value to the mobile P2P terminals but may be set to different values according to each mobile P2P terminal. Further, the values of $\rho$, Spro1, Spro2, Tpro1, and Tpro2 may be dynamically changed according to each mobile P2P terminal.

The second term of Formula (F1-1) has an effect of decreasing the probability when the number of wireless access points APx of the non-mobile P2P communication therearound is large and avoiding mobile P2P delivery at a congested position. On the other hand, when the number of non-mobile P2P devices is small, state transition to the publisher Pubx is likely to occur, and thus the mobile P2P delivery can be performed without significantly influencing the non-mobile P2P device. The third term of Formula (F1-1) has an effect of preventing the number of publishers Pubx from increasing any more when the number of publishers Pubx that perform the mobile P2P communication therearound is large. The probability p3 may be set by a decreasing function of Non-MP2P-congestion(k) and MP2P-congestion(k) rather than Formula (F1-1).

Further, although not necessarily required, the non-mobile P2P wireless access point APx may perform the following operations (G1) to (G4) in combination with the above-described method.

(G1) Some channels are cleared for the mobile P2P communication. The non-mobile P2P APx assumes some channels to be reserved for the mobile P2P communication and uses channels other than the reserved channels.

(G2) Some time slots are cleared for the mobile P2P communication. The non-mobile P2P APx divides time into time slots during which a wireless band can be occupied in turn according to the clock time. For example, the non-mobile P2P APx performs communication only at time slots starting from even-numbered seconds (for example, 03:05:00 to 03:05:01 or 03:05:02 to 03:05:03), and clears time slots starting from odd-numbered seconds for the mobile P2P terminal.

(G3) An arrangement of the publisher Pubx is controlled. There are cases in which the non-mobile P2P APx is equipped with a directional antenna and transfers content to be delivered to the mobile P2P terminal using this antenna. In this case, the non-mobile P2P APx transfers content to the mobile P2P terminal at a long distance from its own device by directional data transmission. As a result, the mobile P2P terminal can start the content delivery front a position at which the mobile P2P communication does not cause much interference with the non-mobile P2P APx.

(G4) The power and the transmission frequency are adjusted. Through the same methods as the ones described above, the non-mobile P2P APx calculates Non-MP2P-congestion(k) and MP2P-congestion(k) and adjusts the transmission power and the data transmission frequency.

As described above, in the present embodiment, a plurality of mobile P2P communication terminals form the local network. Further, any one of the mobile P2P communication terminals serves as the publisher Pubx, and the publisher Pubx transmits data to the subscriber Subx. Moreover, the mobile P2P communication terminals switch its role between the publisher Pubx and the subscriber Subx, and thus the local network is dynamically changed. As a result, content is delivered to a plurality of mobile P2P communication terminals without intervention of an existing network such as the Internet 101. In this case, the mobile P2P communication terminal shares the communication information (Non-MP2P-info, Others-MP2P-info, and Self-MP2P-info) with the wireless device (the wireless access point APx) installed therearound that provides the existing network. Further, the mobile P2P communication terminal adjusts the congestion degree of the wireless communication so that the wireless band is dominated by neither of the existing network nor the mobile P2P content delivery. As a result, at the time of content delivery by the mobile P2P communication terminal, a collaborative operation with the existing network infrastructure is implemented.

For example, there are cases in which mobile phones of a crowd of people gathered at one place due to an event or the like perform the mobile P2P communication. At this time, the number of mobile P2P terminals is much larger than the number of non-mobile P2P devices installed at the event site. In this case, when a large number of mobile P2P terminals perform content delivery, the wireless band is congested. In the present embodiment, the mobile P2P communication terminal adjusts the congestion degree of the mobile P2P communication according to the congestion degrees of the mobile P2P communication and the non-mobile P2P communication. As a result, at the time of the content delivery by the mobile P2P communication terminal, the congestion of the wireless band can be mitigated.

Further, in the present embodiment, the congestion degree calculating unit 24 calculates the congestion degree using Non-MP2P-info, but the congestion degree calculating unit 24 may calculate the congestion degree using a predetermined fixed value instead of at least part of information in Non-MP2P-info.

Further, the congestion degree calculating unit 24 calculates the congestion degree using Others-MP2P-info, but the congestion degree calculating unit 24 may calculate the congestion degree using a predetermined fixed value instead of at least part of information in Others-MP2P-info.

Further, the congestion degree calculating unit 24 calculates the congestion degree using Self-MP2P-info, but the congestion degree calculating unit 24 may calculate the congestion degree using a predetermined fixed value instead of at least part of information in Self-MP2P-info. Moreover, the congestion degree calculating unit 24 calculates the congestion degree using Self-MP2P-info, but the congestion degree calculating unit 24 may calculate the congestion degree without using Self-MP2P-info.

As described above, according to the embodiment, the congestion degree calculating unit 24 acquires the congestion degree of the mobile P2P communication (a first congestion degree of first wireless communication) from the mobile P2P communication terminal. Further, the congestion degree calculating unit 24 acquires the congestion degree of the non-mobile P2P communication (a second congestion degree of second wireless communication) from the wireless access point APx. Furthermore, the congestion degree calculating unit 24 calculates a third congestion degree related to wireless communication based on the first congestion degree and the second congestion degree. Moreover, the operation mode setting unit 21 switches a setting of an operation mode of the mobile P2P communication of its own device to either of the publisher Pubx or the subscriber Subx based on the third congestion degree.

Accordingly, in the mobile P2P communication, wireless communication is performed at the data transmission frequency according to the third congestion degree. Thus, even when the mobile P2P communication and the non-mobile P2P communication are performed together, it is possible to suppress a decrease in the communication rate coming from wireless congestion.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to over such forms or modifications as would fall within the scope and spirit of the inventions.

What is claimed is:

1. A communication apparatus, comprising:
a congestion degree calculating unit that
calculates a third congestion degree related to wireless communication based on a first congestion degree and a second congestion degree, the first congestion degree being a congestion degree of first wireless communication in which peer-to-peer wireless communication is performed between communication apparatuses using wireless bands, the wireless bands including a first channel and a second channel, and the second congestion degree being a congestion degree of second wireless communication in which wireless communication is performed through a wireless communication device connected to a network using the wireless bands including the first channel and the second channel,
wherein the congestion degree calculating unit:
calculates the first congestion degree for each of the first channel and the second channel,
calculates the second congestion degree for each of the first channel and the second channel, and
calculates the third congestion degree for each of the first channel and the second channel based on the first and second congestion degrees;
an operation mode setting unit that switches, based on the third congestion degree, a setting of an operation mode of the first wireless communication of the communication apparatus to one of a first communication mode in which the communication apparatus transmits first content or a second communication mode in which the communication apparatus receives second content;
a wireless interface that performs the first wireless communication based on the operation mode setting.

2. The communication apparatus according to claim 1,
wherein the congestion degree calculating unit calculates the first congestion degree using first information related to the first wireless communication transmitted from another communication apparatus.

3. The communication apparatus according to claim 2, wherein the first information includes at least one of
information of a channel identifying a wireless band in which the other communication apparatus performs the first wireless communication,
a transmission rate at which the other communication apparatus performs the first wireless communication,
transmission power at which the other communication apparatus performs the first wireless communication,
information of a position of the other communication apparatus,
a number of communication apparatuses connected to the other communication apparatus,
an amount of data per unit time that is transmitted and received in the other communication apparatus,
an average of a number of times that back-off has been performed during a predetermined past period of time before the other communication apparatus transmits data, and
information indicating a state as to whether the other communication apparatus is in the first communication mode or the second communication mode.

4. The communication apparatus according to claim 2,
wherein the communication apparatus receives the first information from the other communication apparatus.

5. The communication apparatus according to claim 2,
wherein the communication apparatus acquires the first information through the network and a server.

6. The communication apparatus according to claim 1,
wherein the congestion degree calculating unit calculates the first congestion degree using second information related to the first wireless communication acquired by the communication apparatus when the first wireless communication with another communication apparatus is performed.

7. The communication apparatus according to claim 6, wherein the second information includes at least one of
received power of the first wireless communication performed by the other communication apparatus, and
an error rate of data transfer when the other communication apparatus has performed the first wireless communication.

8. The communication apparatus according to claim 1,
wherein the congestion degree calculating unit calculates the second congestion degree using third information related to the second wireless communication transmitted from the wireless communication device.

9. The communication apparatus according to claim 8, wherein the third information includes at least one of
information of a channel identifying a wireless band in which the wireless communication device performs the second wireless communication,
a transmission rate at which the wireless communication device performs the second wireless communication,
transmission power at which the wireless communication device performs the second wireless communication,
information of a position of the wireless communication device,
a number of wireless apparatuses connected to the wireless communication device,
an amount of data per unit time that is transmitted and received in the wireless communication device, and
an average of a number of times that back-off has been performed during a predetermined past period of time before wireless communication device transmits data.

10. The communication apparatus according to claim 8,
wherein the communication apparatus receives the third information from the wireless communication device.

11. The communication apparatus according to claim 8,
wherein the communication apparatus acquires the third information through the network and a server.

12. The communication apparatus according to claim 1,
wherein the congestion degree calculating unit calculates the second congestion degree using fourth information related to the second wireless communication acquired by the communication apparatus when the second wireless communication with the wireless communication device is performed.

13. The communication apparatus according to claim 12, wherein the fourth information includes at least one of
received power of the second wireless communication performed by the wireless communication device, and
an error rate of data transfer when the wireless communication device has performed the second wireless communication.

14. The communication apparatus according to claim 1,
wherein the congestion degree calculating unit calculates the first congestion degree using fifth information related to the first wireless communication of the communication apparatus.

15. The communication apparatus according to claim 1,
wherein the congestion degree calculating unit calculates the third congestion degree for each of the first channel and the second channel by giving different weights to the first and second congestion degrees.

16. The communication apparatus according to claim 1,
wherein in order to change the operation mode, the operation mode setting unit performs at least one of
selecting a channel from among a plurality of channels that minimizes the third congestion degree,
decreasing transmission power according to the third congestion degree in a selected channel,
decreasing a data transmission frequency according to the third congestion degree in a selected channel,
increasing a probability to transition from the first communication mode to the second communication mode according to the third congestion degree in a selected channel,
decreasing a probability to transition from the second communication mode to the first communication mode according to the third congestion degree in a selected channel, and
delaying multicasting of a received request for data retransmission according to the third congestion degree in a selected channel.

17. A communication method, comprising:
calculating a first congestion degree of first wireless communication in which peer-to-peer wireless communication is performed between communication apparatuses using wireless bands, the wireless bands including a first channel and a second channel, the first congestion degree being calculated for each of the first channel and the second channel;
calculating a second congestion degree of second wireless communication in which wireless communication is performed through a wireless communication device connected to a network, the second congestion degree being calculated for each of the first channel and the second channel;

calculating a third congestion degree related to wireless communication based on the first congestion degree and the second congestion degree, the third congestion degree being calculated for each of the first channel and the second channel based on the first and second congestion degrees; and switching, based on the third congestion degree, a setting of an operation mode of the first wireless communication of the communication apparatus to one of a first communication mode in which the communication apparatus transmits first content or a second communication mode in which the communication apparatus receives second content performing the first wireless communication of the communication apparatus based on the operation mode setting.

18. The communication method according to claim 17, wherein, when the first congestion degree is calculated, first information related to the first wireless communication transmitted from another communication apparatus is used.

19. The communication method according to claim 17, wherein, when the first congestion degree is calculated, second information related to the first wireless communication acquired by the communication apparatus when the first wireless communication with another communication apparatus is performed is used.

20. The communication method according to claim 17, wherein the third congestion degree is calculated for each of the first channel and the second channel by giving different weights to the first and second congestion degrees.

* * * * *